No. 803,227. PATENTED OCT. 31, 1905.
W. B. HARD.
EXCAVATOR.
APPLICATION FILED DEC. 27, 1904.

Witnesses
W. A. Kelly
L. E. Hick

Inventor
Willis B. Hard
By his Attorney
Edward P. Thompson

No. 803,227. PATENTED OCT. 31, 1905.
W. B. HARD.
EXCAVATOR.
APPLICATION FILED DEC. 27, 1904.

Witnesses
W. A. Kelly
L. C. Hicks

Inventor
Willis B. Hard
By his Attorney
Edward P. Thompson

No. 803,227. PATENTED OCT. 31, 1905.
W. B. HARD.
EXCAVATOR.
APPLICATION FILED DEC. 27, 1904.

Witnesses
W. A. Kelly
L. E. Hicks

Inventor
Willis B. Hard
By his Attorney
Edward P. Thompson

UNITED STATES PATENT OFFICE.

WILLIS B. HARD, OF MERIDIAN, MISSISSIPPI.

EXCAVATOR.

No. 803,227. Specification of Letters Patent. Patented Oct. 31, 1905.

Application filed December 27, 1904. Serial No. 238,381.

*To all whom it may concern:*

Be it known that I, WILLIS B. HARD, a citizen of the United States of America, and a resident of Meridian, in the county of Lauderdale and State of Mississippi, have invented certain new and useful Improvements in Excavators, of which the following is a specification.

The object of the invention is to provide a self-loading and self-dumping wagon, this work at present necessitating the use of two separate machines—viz., one for loading and one for dumping earth or other excavated material.

My machine is adapted to load itself, carry the material to any desired point, and then dump it, the various operations being under the control of a single operator. It is comparatively light in weight, thus largely reducing the number of animals necessary for draft purposes, is inexpensive to construct and repair, and is adapted to efficiently fill the place of the cumbersome and expensive machinery now used for the same purpose. It is specially adapted for the construction and maintenance of streets and highways.

The organization comprises a scraper for digging the earth, an endless belt for conveying it to a wagon-box for receiving it, and dumping-doors in the bottom of the box for discharging it thereafter, a driving mechanism operated by the rear wheels for driving the belt, and manually-operated devices for elevating or depressing the scraper for operating a throw-out mechanism for the belt-driver and for controlling the dumping-doors, the whole being mounted upon a vehicle adapted to be drawn by horses.

More particularly the machine consists of a scraper for digging the earth, a wagon-box, an endless belt for conveying the earth to said box, dumping-doors for the box hinged, respectively, at the front and near the middle of said box, a winding-shaft, chains connecting said doors to the winding-shaft, a sprocket-wheel fixed upon the shaft, a second sprocket-wheel at a distance from the first and adapted to be manually rotated, an endless sprocket-chain connecting the two wheels, a pawl and ratchet for holding the sprocket-wheels at different degrees of rotation, a pair of wheels for the vehicle, a pair of cylindrical bearings having each a reduced portion extending toward each other through each of the opposite sides of said box and each having further reduced portions, a tube connecting said bearings by having its ends fitting the respective further-reduced portions, an axle for said vehicle-wheels passing through said bearings, tube, and box in a dust-proof manner, and other correlated features, as described.

In the drawings, wherein like numerals of reference indicate like parts in all the views.

I will first describe the receiving and dumping box. A main carrying-frame 1, having an operator's standing-platform 2 upon its forward end, a body or box portion 3 at its rearward end, said box being provided below with dumping-doors 4 and 5, hinged, respectively, at 6 at the front and 7 near the middle of said box 3, supporting-chains 8 and 9, attached to doors 4 and 5 by eyebolts 10 and 11 and to a winding-shaft 12, journaled upon bearings 13, mounted upon the sides of the box 3, to which they are secured by means of the lag-screws 14, the shaft being provided at one extremity with a sprocket-wheel 15. A sprocket-chain 16 connects the wheel 15 with a similar wheel 17, mounted upon a shaft 18, which is journaled in a bearing 19, mounted upon a standard 20, attached to the framework 1. Mounted upon the shaft 18 is a ratchet-wheel 21 and a hand-wheel 22, preferably provided with a handle 23.

Running transversely of the bottom of the box 3 is a spreader 24 with beveled edges 25' for shedding the dirt and gained out below at 26, so as to form stops for the dumping-doors 4 and 5.

Figure 8:
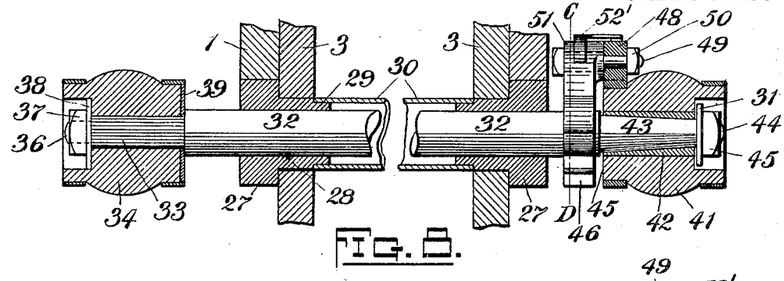
Fig. 8 is a section through line A B, Fig. 1, as viewed from the front of the vehicle, the axle and some of its adjuncts not being shown in section.

I will now describe the rear-axle support. Just below the side members of the frame 1 and at about the middle of the box 3 are bearings 27, (clearly shown in Fig. 8,) attached to the box by bolts 25, each bearing having a reduced portion 28 where it passes through the sides of the box 3 and a further reduced portion 29 within the box 3, over which is adapted to fit a pipe 30. Journaled in the bearings 27 and passing through the pipe 30, which protects it from dirt, is a rear axle 32, having one end 33 squared, so as to fit the hub 34 of the rear wheel 35, fixed to the axle 32, and a threaded extremity 36, fitted with a nut 37 and washer 38 and another washer 39 at the inside of the wheel-hub 34, whereby the axle is securely clamped within said hub. The other rear wheel 40 has a hub 41, fitted with a box 42, within which is journaled the tapered portion 43 of the axle 32, this end of the axle also having a threaded extremity 44, a nut 45, and a washer 31.

Figure 9:
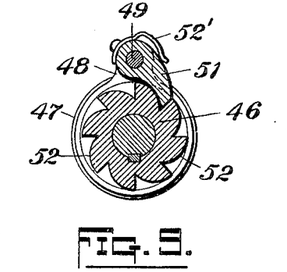
Fig. 9 is a section through line C D, Fig. 8.

The object of the following construction is to convert the loose wheel 40 into a driver when the conveyer-belt is in operation, so as to gain the benefit of the additional adhesion. Rigidly attached to the axle 32 close to the inside face 45 of the hub 41 is a ratchet-wheel 46, Figs. 8 and 9, and surrounding the hub 41 is a band 47, provided with a lug 48, to which is attached a shouldered bolt 49, secured by the nut 50. Pivoted upon the bolt 49 is a dog 51, which engages the teeth 52 of the ratchet-wheel 46 when the machine is drawn forward, but rides the teeth when the wheel 40 is turned backward. The ratchet-wheel 46 is fixed on the shaft 32, and the dog 51 is carried by the hub 41. A spring 52', attached to the lug 48, holds the dog 51 in engagement with the teeth 52 of the wheel 46. This construction permits the vehicle to run backward more easily.

The endless-belt-conveyer construction is as follows: Attached to the side members of the frame 1 upon both sides by bolts 53 are brackets 54, having pins 55, upon which are pivoted the arms 56, within the upper ends of which is journaled the shaft 57, rigidly mounted upon which at its central portion is a drum 58 and at one extremity a pinion 59, which meshes with a spur-gear 60, attached to the spokes 61 of the rear wheel 35 by bolts 36', passing through lugs 37'. About midway of the arms 56 are attached pins 62, upon which are pivoted the reach-rods 63 64. Near the forward end of the machine and within convenient reach of the operator and near the other controlling devices is a lever 65, provided with a handle 66 at the top and a latch 67, pivoted upon the lever 65 by the pin 68 and having a lip 69, adapted to rest in one or other of the notches 70 of the stationary quadrant 71, whereby the lever 65, and through it the reach-rods 63 64, may be locked in forward or backward positions. The lever 65 is mounted upon a shaft 72, having a second lever 73 at its opposite end, upon which is pivoted the reach-rod 64. The shaft 72 is mounted in bearings 74, which are attached to the frame 1 by bolts 75. Journaled upon the shaft 57 is a frame composed of two parallel bars 76, which are bent so as to meet near their lower extremities, where they are riveted or otherwise securely fastened together at 77, when they are again bent outward and thence forward and form bearings for a shaft 78, upon which is mounted a drum 79. Thereafter they are again bent inward and then outward and attached by bolts 80 to the reinforcing angle-irons 81 of the scraper 82, which is otherwise of the ordinary construction.

An endless conveyer-belt 100 passes over both of the rollers 58 and 79, which are carried by the frame 76, and its driven side (the upper one) is at all times further supported by a series of rollers 101, having journals 102 at both ends, which pass through bearings 103, attached to the sides of the frame 76 by rivets or bolts 104.

Figure 1:
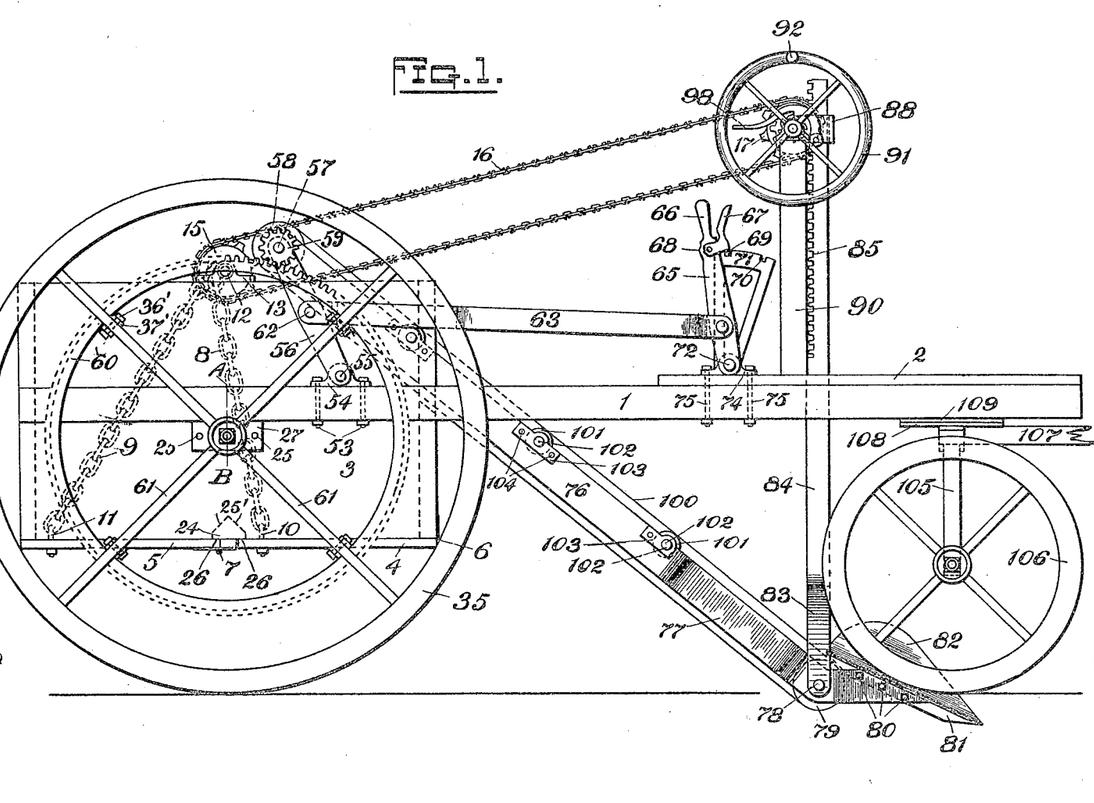
Figure 1 is a side elevation of the complete machine.
Figure 2:
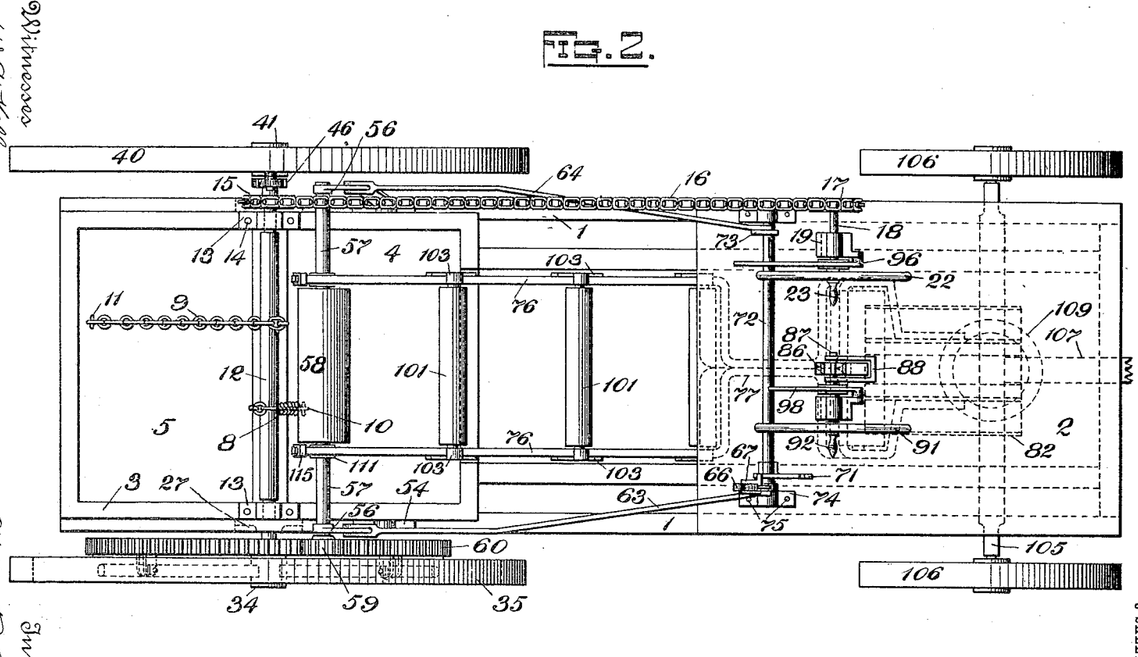
Fig. 2 is a plan of same, with conveyer-belt removed, on a large scale.
Figure 3:
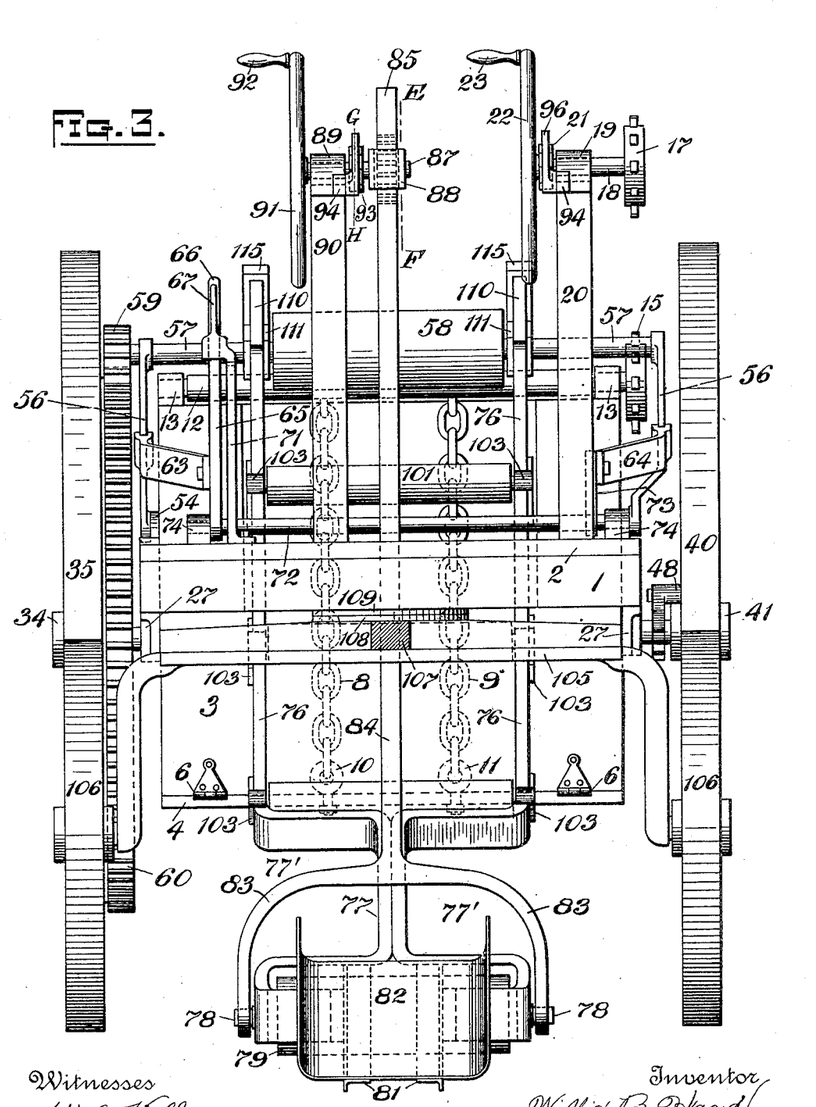
Fig. 3 is a front elevation of same, on a large scale, with conveyer-belt and sprocket-chain removed.
Figure 10:
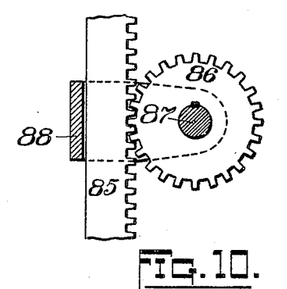
Fig. 10 is a section through line E F, Fig. 3, showing rack and pinion.
Figure 11:
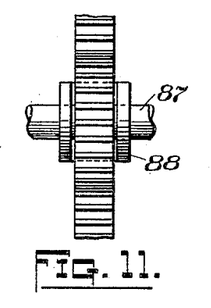
Fig. 11 is a rear elevation of same, not in section.

The elevator for the scraper consists of the shaft 78, extended at both ends beyond the side bars 76, and upon these extensions are pivoted the forked ends 83 of an elevating and depressing bar 84, provided upon one face at the top and for some distance down with a rack 85, which meshes with a pinion 86, mounted upon a shaft 87, and is held in mesh with said pinion at all times by a cuff 88, Figs. 10 and 11, which is pivoted upon the shaft 87. The shaft 87 is journaled in a bearing 89, (see Fig. 3,) attached to the standard 90, mounted upon the frame 1, and is provided with a hand-wheel 91 with a handle 92 and a ratchet-wheel 93.

Figure 12:
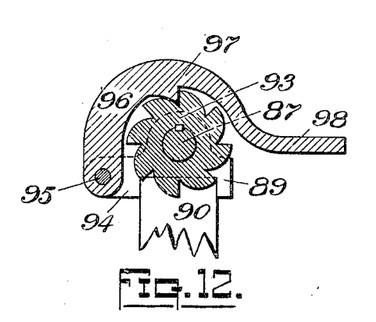
Fig. 12 is a section through line G H, Fig. 3, showing ratchet-wheel and lever.
Figure 13:
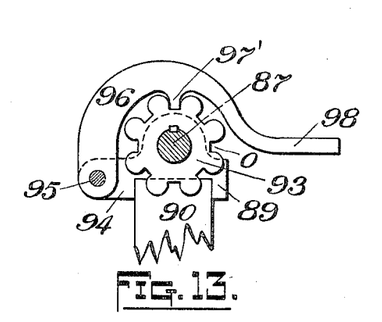
Fig. 13 is a modified form of wheel and lever.

Each of the bearings 19 and 89 has a lug 94, Figs. 12 and 13, carrying a pin 95, fulcrumed upon which is a lever 96, having a tooth 97, which rides the teeth of the ratchet-wheels 21 and 93 when the shaft 18 is turned over forward and the shaft 87 backward, but catches in same and prevents their rotation in the opposite directions. An extension 98 of each of the levers 96 forms a handle by means of which its tooth may be raised out of engagement with the corresponding ratchet-wheel 21 or 93. In Fig. 13 is shown a modified form of ratchet-wheel 93. In place of the teeth it is provided with a series of notches O upon its rim, and the tooth 97' is modified in shape so as to fit into same, this construction affording a means of locking the shaft 87 against rotation in either direction.

Under the forward part of the machine is an axle 105, of inverted-U shape, carrying the wheels 106. To the center and at right angles to the upper part of the axle 105 is secured a pole 107, (a portion only of which is shown on the drawings,) to which the draft-animals may be harnessed in the ordinary manner. Above the pole 107 and rigidly secured to same and to the axle 105 is the lower member 108 of a fifth-wheel, the upper member of which, 109, is secured to the body 1 of the machine. The recesses 77' upon either side of the frame 76, where the side members meet at 77, are provided, so as to permit the machine to be turned within as narrow a radius as possible. The wheels 106 may be allowed to rub against the belt 100 and deflect the same considerably without damage to it when the machine is being turned around.

Figures 4, 5, 6, 7:
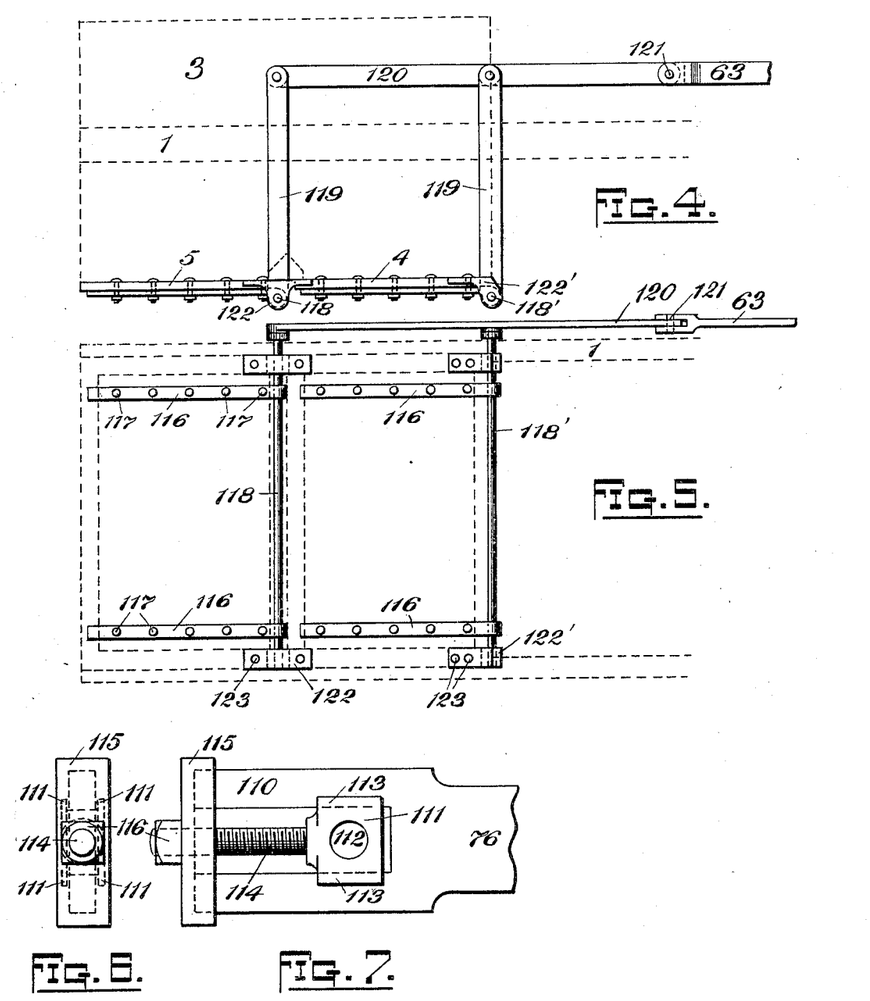
Fig. 4 is a side elevation of a modified form of dumping-rigging.
Fig. 5 is a plan of same.
Fig. 6 is an end view of one of the belt-tighteners.
Fig. 7 is a side view of same.

In order to retain the belt 100 at a proper degree of tension, the device shown in Figs. 6 and 7 is used. The side bars of the drum-carrying frame 76 are provided at the top with forked ends 110. A block 111, having a bearing 112 for the shaft 57 and provided with flanges 113 at top and bottom, is adapted to slide in the opening so formed and is held from slipping out by the said flanges 113. To the block 111 is rigidly attached a screw 114, extending endwise from same and at right angles to the bearing 112 and passing freely through a hole in the center of a cap 115, which is recessed to fit over the forked ends 110. Exterior to the cap 115 is a nut 116 upon a screw 114, whereby the block 111 may be drawn outward, so as to put the necessary tension upon the belt 100. When by reason of excessive stretching of the belt from constant use the block reaches the limit of its outward travel, it is returned to the other extreme position and the belt taken out, cut, and spliced, so as to reduce its length. The adjustment described will, however, prove adequate under all ordinary conditions without any necessity for shortening the belt.

In Figs. 4 and 5 is shown a modified form of mechanism for operating the dumping-doors, showing outline of the box 3 in dashes, in the latter figure the doors being also shown in dots and dashes. In this case the doors are attached to parallel strips of metal 116 by bolts 117, these strips 116 being rigidly connected at one end to two shafts 118 118', one for each door, and each of the shafts 118 having rigidly attached to it at one extremity and exterior to the box 3 an upright lever 119, to the upper ends of both of which levers 119 is pivoted a single bar 120, pivoted by a pin 121 to a single reach-rod 63. The shafts 118 118' oscillate in bearings 122 122', secured by bolts 123 to the under sides of the box 3.

In operating the machine the doors 4 and 5 are closed at starting by winding up the chains 9 and 10 through the medium of the winding-shaft 12, its sprocket-wheel 15, the chain 16, the sprocket-wheel 17, and its shaft 18 by turning the hand-wheel 22 over in a forward direction, when it is held by means of the ratchet-wheel 21 and its lever 96.

The scraper 82, and with it the lower end of the frame 76, is then lowered by its own weight and that of the connected parts (the lower end of the belt being at all times in fixed relation to the scraper) to the required depth, by means of the bar 84, with its rack 85 and the pinion 86, by raising the lever 96 and controlling the fall by grasping the hand-wheel 91 and allowing the same to rotate slowly in a forward direction. The lever 96 is then released and prevents any further downward movement of the scraper. As the machine moves forward by means of the spur-gear 60, attached to the rear wheel 35, the pinion 59, and with it the drum 58, is caused to rotate in a backward direction, causing the upper part of the belt 100 to travel upwardly and rearwardly to a point above and slightly forward of the center of the box 3. The excavated material passing over the whole length of the scraper 82 and thence upon the lower end of the belt 100 is thus continuously conveyed to the box 3, into which it is discharged by the continued motion of the belt. When the box has been fully loaded, the lever 65 after the latch 67 has been released from the rear notch in the quadrant 71 is moved forward and the latch engaged with the forward notch 70 of the quadrant 71. By this movement the shaft 72 is rotated through a small arc, and the reach-rods 63 64, and through them the arms 56, are drawn forward. The rise of arc through which the latter move as they pivot upon the pins 55 carries their upper ends upward as well as forward. They thus convey the same movement to the shaft 57, with its pinion 59, and raise the latter out of engagement with the spur-gear 60, the frame meanwhile pivoting upon the journals 78 and the bar 84 upon the shaft 87 through the medium of the rack 85, the pinion 86, and the cuff 88. The lower end of the frame 76 is then raised by turning the wheel 91 and connected parts over in a backward direction, thus also raising the lower end of the belt 100, together with the scraper, into a position in which the latter rests within the space beneath the U-shaped axle.

The machine having next been moved to the desired point for dumping the load, the lever 96, now in engagement with the ratchet-wheel 21, is raised, releasing the wheel 22. The weight of the load in the box 3 now opens the dumping-doors 4 and 5 downwardly, meanwhile rotating the winding-shaft 12 in a backward direction as the chains 8 and 9 unwind from the shaft, the shaft 18, through the medium of the chain 16, partaking, meanwhile, of the same motion. The direction in which the doors fall and the position in which they are hung enables the machine to be withdrawn readily from the dumped load and also preserves them from possible injury from striking immovable obstructions which may be upon the ground, as they will tilt upwardly upon their hinges and pass over such obstructions. The load having been dumped, the doors are again closed, and the machine is immediately ready for a repetition of the same series of operations.

It will be readily seen from the foregoing specification that the machine may be quickly and conveniently handled by a single operator, resulting in great economy of time and labor.

I claim as my invention—

1. An excavator consisting of the combination of a scraper for digging and receiving earth, a wagon-box, a conveyer for receiving the earth from the scraper and carrying the earth to said box, dumping-doors in the bottom of the box for discharging the earth therefrom, a vehicle having wheels, a driving mechanism operated by said wheels for driving said conveyer, a manually-operated device for elevating and depressing said scraper, a releasing mechanism for the conveyer, a manual device for operating the same, and a manually-operated device for controlling said dumping-doors.

2. In an excavator the combination of a scraper for digging the earth, a wagon-box, an endless belt for conveying the earth to said box, dumping-doors for the box hinged respectively at the front and near the middle of said box, a winding-shaft, chains connecting said doors to the winding-shaft, a sprocket-wheel fixed upon the shaft, a second sprocket-wheel at a distance from the first and adapted to be manually rotated, an endless sprocket-chain connecting the two wheels, and a pawl and ratchet for holding the sprocket-wheels at different degrees of rotation.

3. In an excavator the combination of a scraper for digging the earth, a wagon-box, an endless belt for conveying the earth to said box, dumping-doors for the box hinged respectively at the front and near the middle of said box, a winding-shaft, chains connecting said doors to the winding-shaft, a sprocket-wheel fixed upon the shaft, a second sprocket-wheel at a distance from the first and adapted to be manually rotated, an endless sprocket-chain connecting the two wheels, a pawl and ratchet for holding the sprocket-wheels at different degrees of rotation, and a spreader with beveled edges on its upper portion, and overlapping one door at that edge farthest from its hinges, and the other door at that edge which is connected to its hinges.

4. In an excavator the combination of a scraper for digging the earth, a wagon-box, an endless belt for conveying the earth to said box, dumping-doors for the box hinged respectively at the front and near the middle of said box, a winding-shaft, chains connecting said doors to the winding-shaft, a sprocket-wheel fixed upon the shaft, a second sprocket-wheel at a distance from the first and adapted to be manually rotated, an endless sprocket-chain connecting the two wheels, a pawl and ratchet for holding the sprocket-wheels at different degrees of rotation, a pair of wheels for the vehicle, a pair of cylindrical bearings, having each a reduced portion extending toward each other through each of the opposite sides of said box, and each having further reduced portions, a tube connecting said bearings by having its ends fitting the respective further reduced portions, and an axle for said pair of wheels passing through said bearings, tube and box in a dust-proof manner.

5. In an excavator, the combination of a scraper for digging and receiving earth, a wagon-box, a conveyer for receiving the earth from the scraper and carrying the earth to said box, dumping-doors in the bottom of the box for discharging the earth therefrom, a vehicle having wheels, a driving mechanism operated by said wheels for driving said conveyer, a manually-operated device for elevating and depressing said scraper, a releasing mechanism for the conveyer, a manual device for operating the same, a manually-operated device for controlling said dumping-doors, a pair of wheels for the vehicle, a pair of cylindrical bearings, having each a reduced portion extending toward each other through each of the opposite sides of said box, and each having further reduced portions, a tube connecting said bearings by having its ends fitting the respective further reduced portions, and an axle for said wheels passing through said bearings, tube and box in a dust-proof manner.

6. In an excavator consisting of the combination of a scraper for digging and receiving earth, a wagon-box, a conveyer for receiving the earth from the scraper and carrying the earth to said box, dumping-doors in the bottom of the box for discharging the earth therefrom, a vehicle having wheels, a driving mechanism operated by said wheels for driving said conveyer, a manually-operated device for elevating and depressing said scraper, a releasing mechanism for the conveyer, a manual device for operating the mechanism, a manually-operated device for controlling said dumping-doors, a pair of cylindrical bearings, having each a reduced portion extending toward each other through each of the opposite sides of said box, and each having further reduced portions, a tube connecting said bearings by having its ends fitting the respective further reduced portions, an axle for said wheels passing through said bearings, tube, and box in a dust-proof manner, a ratchet-wheel fixed upon said shaft, a ratchet mounted upon a hub of one of said vehicle-wheels which is loose upon said shaft, and a gear-wheel mounted upon another of said vehicle-wheels, the said ratchet engaging the teeth of said ratchet-wheel when the vehicle is drawn forward but riding freely over the teeth when the vehicle moves backward.

7. In an excavator, the combination of a scraper for digging and receiving earth, a wagon-box, a conveyer for receiving the earth from the scraper and carrying the earth to said box, dumping-doors in the bottom of the box for discharging the earth therefrom, a vehicle having wheels, a driving mechanism operated by said wheels for driving said conveyer, a manually-operated device for elevating and depressing said scraper, a releasing mechanism for the conveyer, a manual device for operating the mechanism, a manually-operated device for controlling said dumping-doors, a pair of cylindrical bearings, having each a reduced portion extending toward each other through each of the opposite sides of said box, and each having further reduced portions, a tube connecting said bearings by having its ends fitting the respective further reduced portions, an axle for said wheels passing through said bearings, tube and box in a dust-proof manner, a ratchet-wheel fixed upon said shaft, a ratchet mounted upon a hub of one of said vehicle-wheels, which one is loose upon said shaft, and a gear-wheel mounted upon another of said vehicle-wheels, the said ratchet engaging the teeth of said ratchet-wheel when the vehicle is drawn forward but riding freely over the teeth when the vehicle moves backward, the conveyer having a pinion gearing with said gear-wheel and being adapted to be disengaged therefrom by the action of one of said manually-operated devices.

8. In an excavator the combination of a wagon-box, vehicle-wheels, a shaft, a ratchet-wheel fixed upon said shaft, a ratchet mounted upon a hub of one of said vehicle-wheels, which one is loose upon said shaft, and a gear-wheel mounted upon another of said vehicle-wheels, the said ratchet engaging the teeth of said ratchet-wheel when the vehicle is drawn forward but riding freely over the teeth when the vehicle moves backward.

9. In an excavator, the combination of a vehicle, a containing-box therefor, a pair of wheels for the vehicle, a pair of cylindrical bearings, having each a reduced portion extending toward each other through each of the opposite sides of said box, and each having further reduced portions, a tube connecting said bearings by having its ends fitting the respective further reduced portions, and an axle for said wheels passing through said bearings, tube and box in a dust-proof manner.

10. In an excavator the combination of a wagon-box, vehicle-wheels, a shaft, a ratchet-wheel fixed upon said shaft, a ratchet mounted upon a hub of one of said vehicle-wheels, which is loose upon said shaft, a gear-wheel mounted upon another of said vehicle-wheels, the said ratchet engaging the teeth of said ratchet-wheel when the vehicle is drawn forward but riding freely over the teeth when the vehicle moves backward, a ring fixed upon said loose hub, of said loose wheel, a lug 48 thereon, and a bolt passing through said lug and forming a pivot for said ratchet.

11. In an excavator the combination of a carrying-frame, a platform upon its forward end, a wagon-box at its rear end, dumping-doors at the base of the box hinged respectively at the front and middle of the box, supporting-chains attached to said doors, a winding-shaft for said chains, bearings upon the sides of the box, in which bearings said shaft is journaled, a sprocket-wheel on the shaft, a hand-wheel at a distance from the shaft, a second sprocket-wheel governed by said hand-wheel, and a chain connecting the two sprocket-wheels.

12. In an excavator the combination of a carrying-frame, a platform upon its forward end, a wagon-box at its rear end, dumping-doors at the base of the box hinged respectively at the front and middle of the box, supporting-chains attached to said doors, a winding-shaft for said chains, bearings upon the sides of the box, in which bearings said shaft is journaled, a sprocket-wheel on the shaft, a hand-wheel at a distance from the shaft, a second sprocket-wheel governed by said hand-wheel, a chain connecting the two sprocket-wheels, bearings having reduced portions passing through the sides of the box, a pipe connecting said bearings, a shaft passing through said bearings and pipe, a vehicle-wheel loose upon the last-named shaft, a clutch operative between the last-named shaft and loose wheel for clutching the two in one direction of rotation only, a gear-wheel mounted upon another vehicle-wheel, and an earth-conveyer governed by said gear-wheel.

13. In an excavator the combination of a carrying-frame, a platform upon its forward end, a wagon-box at its rear end, dumping-doors at the base of the box hinged respectively at the front and middle of the box, supporting-chains attached to said doors, a winding-shaft for said chains, bearings upon the sides of the box, in which bearings said shaft is journaled, a sprocket-wheel on the shaft, a hand-wheel at a distance from the shaft, a second sprocket-wheel governed by said hand-wheel, a chain connecting the two sprocket-wheels, bearings having reduced portions passing through the sides of the box, a pipe connecting said bearings, a shaft passing through said bearings and pipe, a vehicle-wheel loose upon the last-named shaft, a clutch operative between the last-named shaft and loose wheel for clutching said loose wheel and shaft in one direction of rotation only, a gear-wheel mounted upon another vehicle-wheel, an earth-conveyer governed by said gear-wheel, the means for governing the conveyer from the gear-wheel, consisting of a pinion engaging with the latter, a shaft for the pinion, bearings for the last-named shaft, pivoted arms carrying said bearings, reach-rods pivoted to said arms, and a handle and catch for the reach-rods for throwing said pinion into and out of engagement with said gear-wheel, said conveyer being a belt driven by said last-named shaft.

14. In an excavator, the combination of a wagon-box, bearings having reduced portions passing through the sides of the box, a pipe, connecting said bearings, a shaft passing through said bearings and pipe, a vehicle-wheel loose upon the last-named shaft, a clutch operative between the last-named shaft and loose wheel for clutching the shaft and loose wheel in one direction of rotation only, a gear-wheel mounted upon another vehicle-wheel, and an earth-conveyer governed by said gear-wheel.

15. In an excavator, the combination of a wagon-box, bearings having reduced portions passing through the sides of the box, a pipe, connecting said bearings, a shaft passing through said bearings and pipe, a vehicle-wheel loose upon the last-named shaft, a clutch operative between the last-named shaft and loose wheel for clutching the shaft and loose wheel in one direction of rotation only, a gear-wheel mounted upon another vehicle-wheel, an earth-conveyer governed by said gear-wheel, the means for governing the conveyer from the gear-wheel, consisting of a pinion engaging with the latter, a shaft for the pinion, bearings for the last-named shaft, pivoted arms carrying said bearings, reach-rods pivoted to said arms, and a handle and catch for the reach-rods for throwing said pinion into and out of engagement with said gear-wheel, said conveyer being a belt driven by said last-named shaft.

16. In an excavator, the combination of a wagon-box, bearings having reduced portions passing through the sides of the box, a pipe, connecting said bearings, a shaft passing through said bearings and pipe, a vehicle-wheel loose upon the last-named shaft, a clutch operative between the last-named shaft and loose wheel for clutching the shaft and loose wheel in one direction of rotation only, a gear-wheel mounted upon another vehicle-wheel, an earth-conveyer governed by said gear-wheel, the means for governing the conveyer from the gear-wheel, consisting of a pinion engaging with the latter, a shaft for the pinion, bearings for the last-named shaft, pivoted arms carrying said bearings, reach-rods pivoted to said arms, a handle and catch for the reach-rods for throwing said pinion into and out of engagement with said gear-wheel, said conveyer being a belt driven by said last-named shaft, a frame supporting the last-named shaft at one end of the frame and carrying rollers for said belt, a pivot for another portion of said frame, which consists of arms having bearings for supporting the ends of two of the central rollers, and bent centrally of the vehicle and then running parallel to each other, and fastened together, and then outwardly again in opposite directions, the bends being for forming recesses, front wheels for said vehicle, which when steering throws one of the wheels into one of the recesses, and a scraper mounted upon said frame-bars beyond said recesses as measured from said last-named shaft.

17. In an excavator, the combination of a pair of vehicle-wheels, a shaft therefor, a gear-wheel operative from said shaft, a pinion for engaging with said gear-wheel, a frame supporting the last-named shaft at one end of the frame and carrying rollers for said belt, a pivot for another portion of said frame, which consists of arms having bearings for supporting the ends of two of the central rollers, and bent centrally of the vehicle and then running parallel to each other, and fastened together, and then outwardly again in opposite directions, the bends being for forming recesses, front wheels for said vehicle which when steering throws one of the wheels into one of the recesses, a scraper mounted upon said frame-bars beyond said recesses as measured from said last-named shaft, and a manually-operative device for throwing said pinion into and out of engagement with said gear-wheel, said device consisting of pivoted arms carrying the last-named shaft, a handle and catch therefor, and reach-rods connecting said arms to said handle.

18. In an excavator, the combination of a scraper, a frame consisting of two parallel bars and fastened to said scraper and inclined downward, a rack with its lower end pivoted to the lower end of said frame, a moving belt conveyer on the frame at the exit of said scraper, a pivot for the upper end of said frame, a pinion for said rack, a bearing for the upper end of the rack, a manual device for turning said pinion for elevating and depressing said scraper through the action of said rack, pivoted arms for supporting the upper pivoted end of said frame, reach-rods pivoted to said arms, a manual device for moving said rods to different positions, and a catch for locking said rods in their respective positions.

Dated this 14th day of December, 1904.

WILLIS B. HARD. [L. S.]

Witnesses:
 L. ROY HARD,
 RICHD. G. V. MYTTON.